Oct. 22, 1957 J. W. ARMBRUSTER 2,810,652
CONTINUOUS FORMING OF CONTAINERS OF GELATINOUS FOOD
Filed July 29, 1949 8 Sheets-Sheet 1
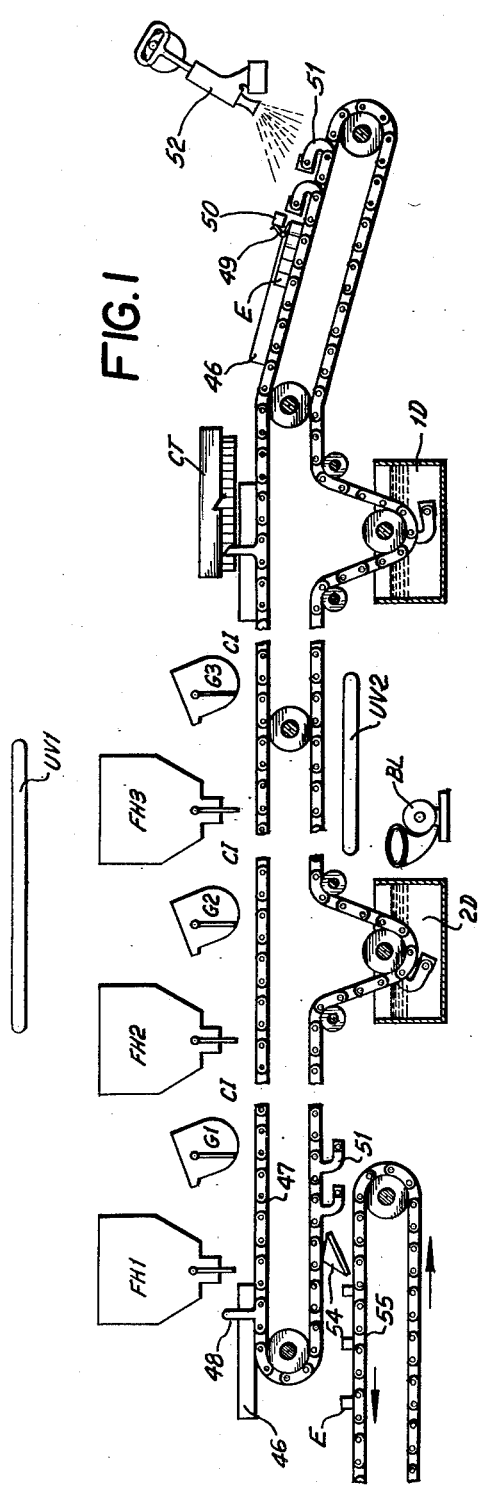
FIG. 1
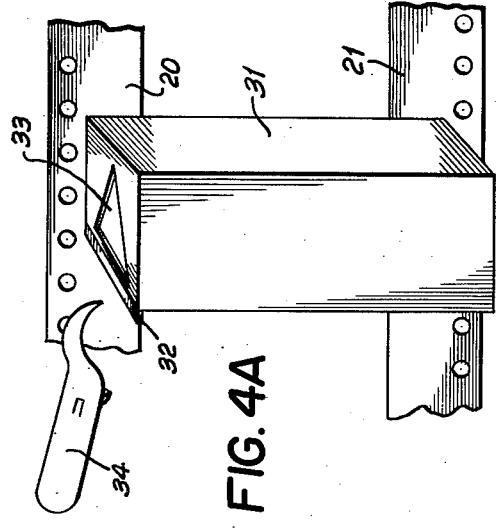
FIG. 4A
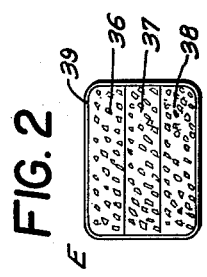
FIG. 2
FIG. 4
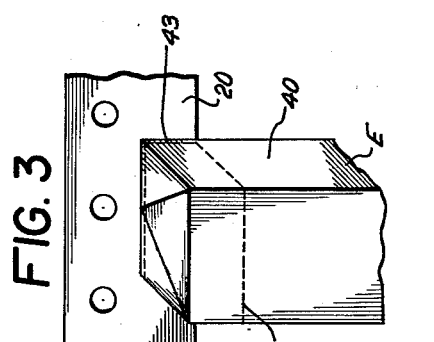
FIG. 3
INVENTOR.
John W. Armbruster Oct. 22, 1957      J. W. ARMBRUSTER      2,810,652
CONTINUOUS FORMING OF CONTAINERS OF GELATINOUS FOOD
Filed July 29, 1949      8 Sheets-Sheet 2

FIG. IA

INVENTOR.
John W. Armbruster

Oct. 22, 1957   J. W. ARMBRUSTER   2,810,652
CONTINUOUS FORMING OF CONTAINERS OF GELATINOUS FOOD
Filed July 29, 1949   8 Sheets-Sheet 3
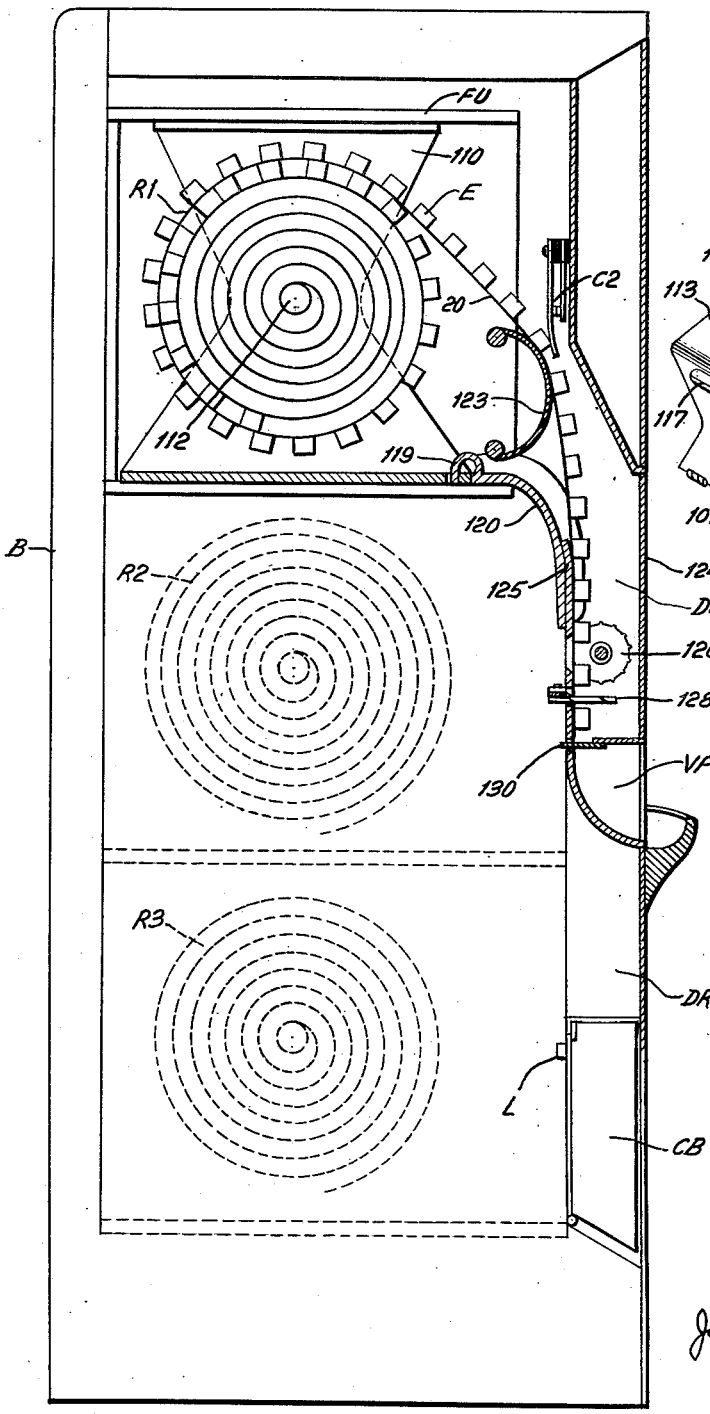
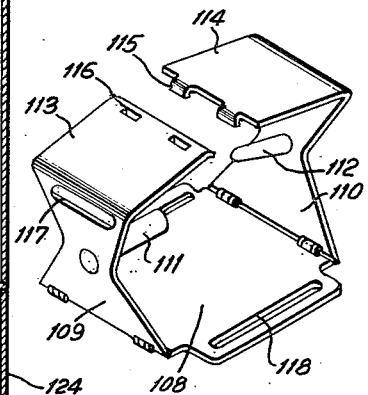
INVENTOR.
John W Armbruster Oct. 22, 1957     J. W. ARMBRUSTER     2,810,652
CONTINUOUS FORMING OF CONTAINERS OF GELATINOUS FOOD
Filed July 29, 1949     8 Sheets-Sheet 4

INVENTOR.
John W. Armbruster

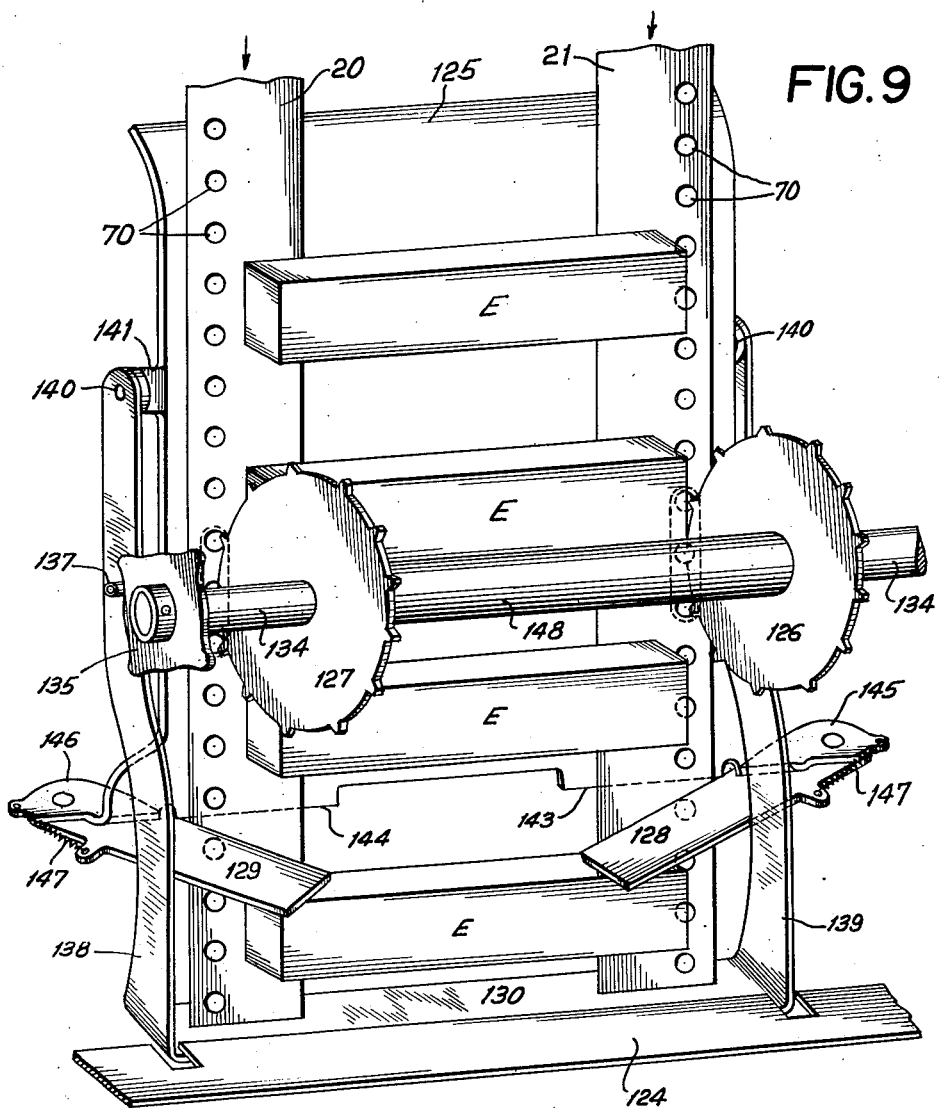

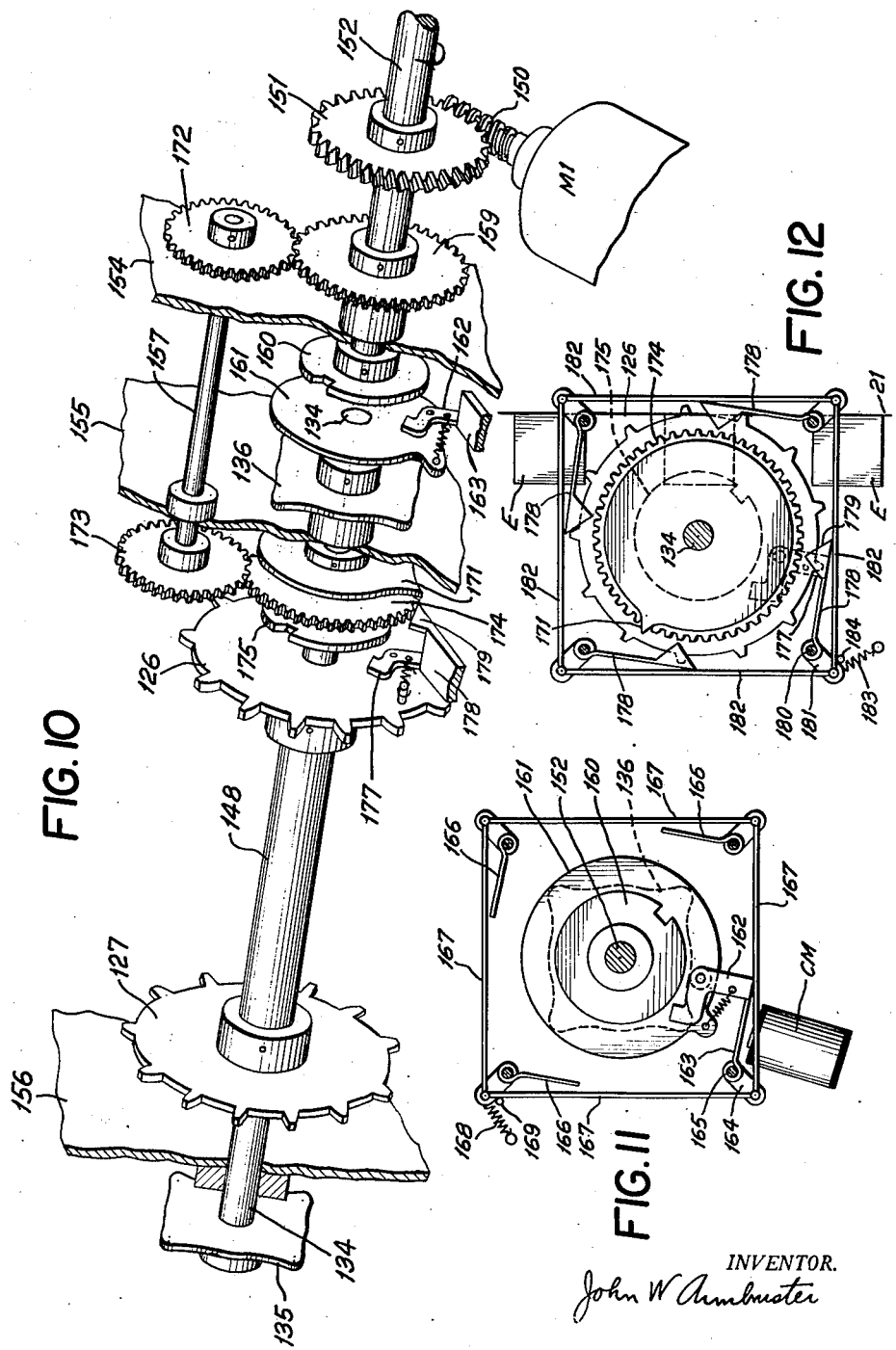

Oct. 22, 1957  J. W. ARMBRUSTER  2,810,652
CONTINUOUS FORMING OF CONTAINERS OF GELATINOUS FOOD
Filed July 29, 1949  8 Sheets-Sheet 7
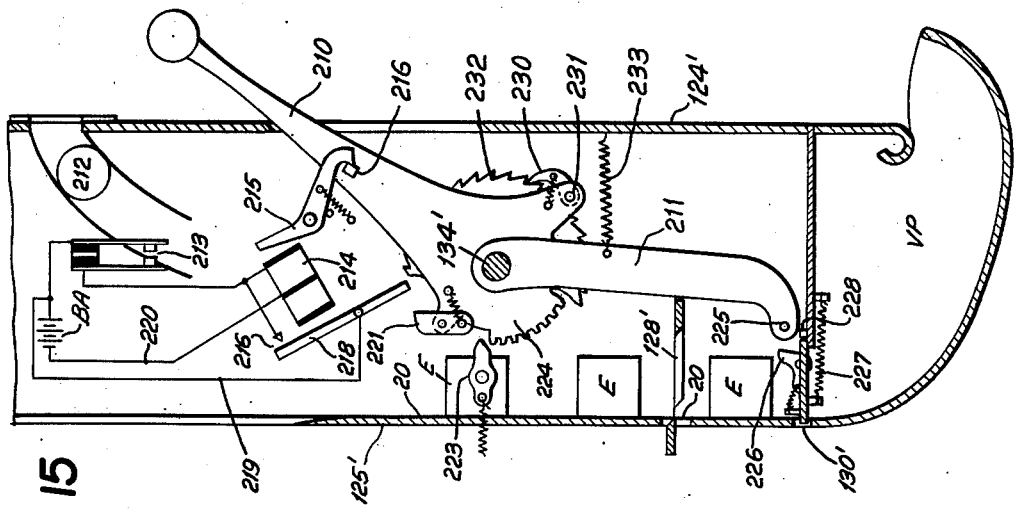
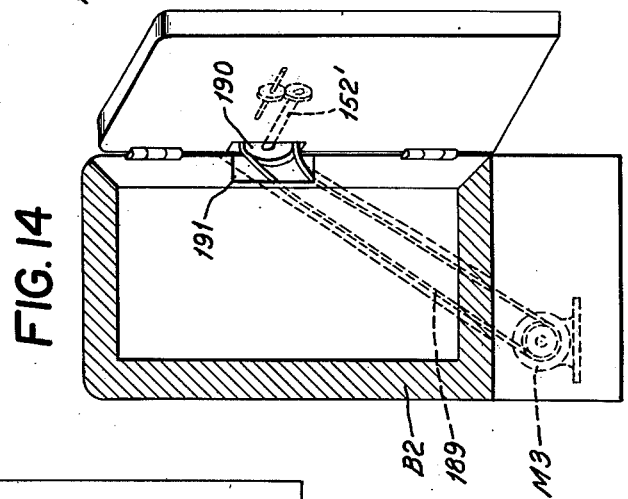
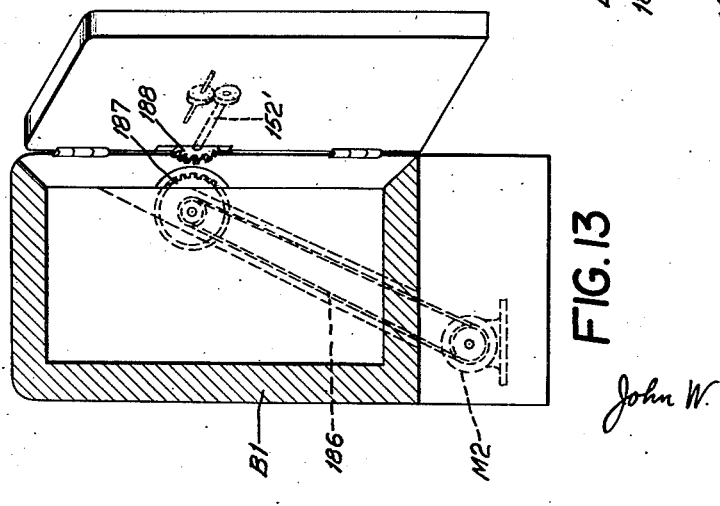
INVENTOR.
John W. Armbruster

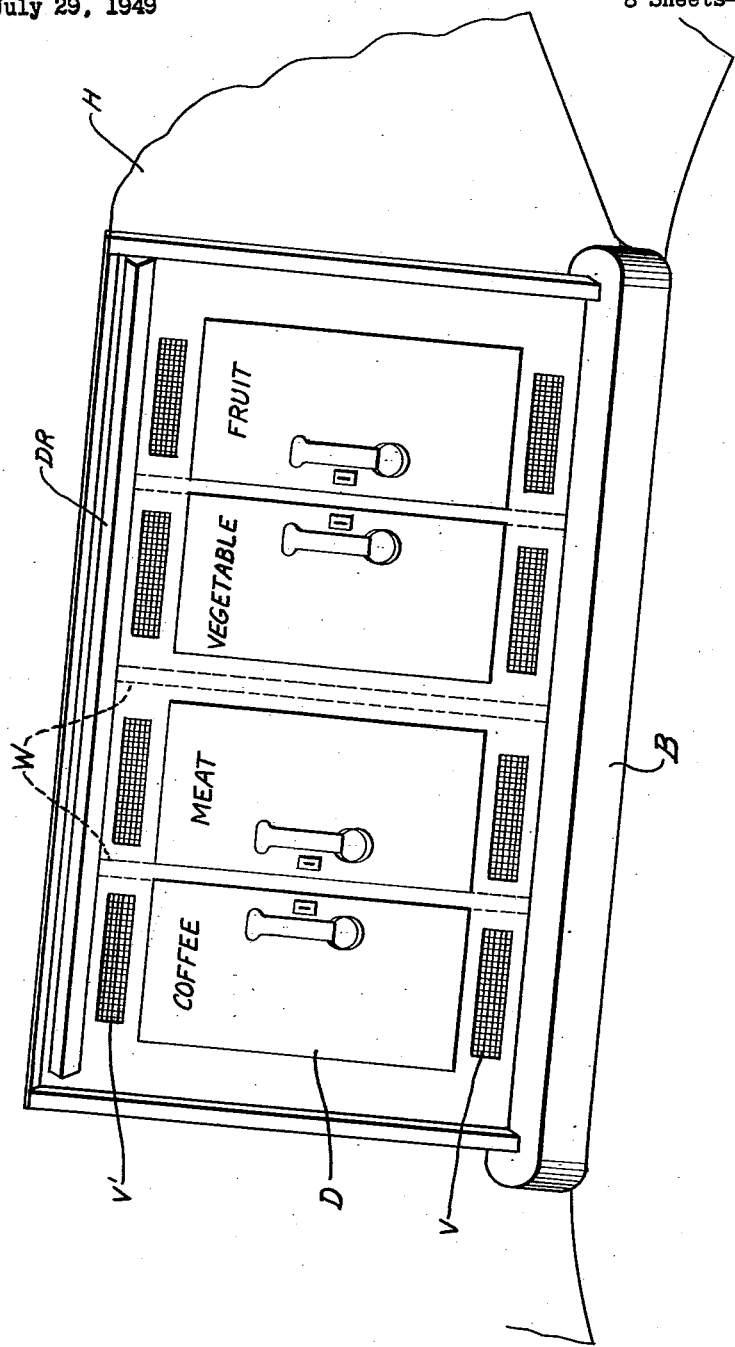

United States Patent Office 2,810,652
Patented Oct. 22, 1957

2,810,652
CONTINUOUS FORMING OF CONTAINERS OF GELATINOUS FOOD

John W. Armbruster, East Rockaway, N. Y.

Application July 29, 1949, Serial No. 107,591

1 Claim. (Cl. 99—171)

This invention relates to improvements in vending devices for dispensing refrigerated food elements and the composition, wrapping and handling of fruit, vegetable and meat bars.

An object of the invention is the provision of accurate and dependable feed devices under coin control for issuing one food element for each deposited coin. The food elements are mounted on tapes with marginal perforations engaged by pin feed devices for positive feeding. A connected series of the elements are wound as a spiral and so stored for compactness and also withdrawn one by one by unwinding the spiral by the positive pin wheel feed.

Another object of the invention is to provide an appetizing and healthful food element in the form of ground, shredded and tenderized vegetables, fruits and meats encased as an aspic in agar agar, gelatine, fruit juice and pectin, or the like, as a unit easy to handle, wrap and dispense, and also convenient to eat without dishes or cutlery. The food unit is contemplated for use as a roadside or luncheon item of consumption as a supplement or substitute for the usual frankfurter and roll.

It is rather well established that the diet of most persons is not rounded out with vegetable and fruit elements in addition to the usual meat, starch and sugar. This is believed due largely to the time involved in the cooking and serving of vegetables and fruit. There is nothing available in the vegetable and fruit line for rapid consumption comparable to the perennial hot dog. Candy bars are constituted largely of sugars and concentrated proteins of nuts and chocolates and do not fill the need. Therefore, the present invention in the provision of cooked or raw dessicated vegetables, fruit and meat, either separately or in proper dietary and appetizing combinations, encased in a handy refrigerated aspic, is believed to fill a long felt want and be extremely useful.

An object of the invention is to provide wrappings for each food element to retain its handy oblong shape, protect it from moisture, air and contamination, make it easy to peel off, prevent it from sticking to the refrigeration compartment, and easy to feed. A waxed or similarly treated paper is the inner coating of the food element. This may be used alone or supplemented by an outer advertising wrapper attached to marginal feed tapes, said tapes being of moisture-proof paper.

Another object of the invention is the provision of a process for producing a protected food element. A preferable mode of constructing food bars is by molding or submerging food portions in aspics, jellies, gelatine, or the like, in shallow pans, and, to prevent the food portions from sinking to the bottom, this may be done in layers. Then the large sheet or block of aspic is cut into separate bars. Because, in so cutting the material, some food portions are on the outside and exposed to air, another coating step is employed for putting a thin coating of concentrated gelatine, or a plastic, on by dipping each bar in liquified concentrated gelatine or a vinyl resin latex. Then each bar is aired separately for drying and hardening purposes before being wrapped. The process involves a seeming inconsistency in coating and wrapping to prevent contact with air and yet one step is the blowing of air on the bars. The explanation is that the blowing is done with sterile air for drying and hardening purposes, while too free contact with ordinary air leads to contamination and is to be avoided.

Another object of the invention is to mount all dispensing operating parts in a unitary basis on a standard refrigerator door. An outer plate is removable for inspection and repair and an inner plate holds side frames with the dispensing mechanism to be taken out for replacement. A lock is substituted for the handle of the door.

Another object of the invention is the axial alignment of two or more dispensing units for separate handling of meat, vegetable and fruit bars under control of a common drive means with separate clutches for each unit. A common drive motor is called in electrically by a dropping coin and held in operation a desired length of time by dash pot control to insure dispensing action. In the case of use of the common compressor motor for the dispensing driver, such enforced length of energization may be gauged to make up in refrigeration for the loss in cold air due to opening the vending port.

Another object of the invention is the provision of alternative forms of operating means, dependent and independent of current supply. A manually operated form of dispenser has a simple coin release and oscillating pull handle for feed, cutting and shield movements. Another form of drive is derived directly from the refrigerating motor by an extensible belt in a side wall passing thru holes in wall edge and door hinge side to a pulley mounted near the door hinge. Thus the drive is maintained with the door open or shut. Another form of drive using the refrigerating motor for dispensing involves a pulley connection to a gear in the box wall with gear teeth extending into the hinge opening to mesh with another gear in the door and on the drive shaft for the dispensing devices. A fourth form of drive is by a separate motor mounted within the door and having a reducing gear drive directly to a common shaft between two dispensing units.

Another object of the invention is the provision of separate clutches for the feeding devices as distinguished from the cutting and shielding devices. The cutting and shielding devices are operated first and a food element drops out and the shield closes before the feeding devices advance another element in a position to be severed. A single magnet is used to trip both clutches, because the drive of the second is mechanically caused by cam action at the end of movement of the first. Each of the two clutches has four stopping positions because of the short movements involved, and the four clutch pawl disengaging stops are interconnected for common movement. So in effect the one clutch magnet takes the place or has the effect of eight clutch magnets in governing the stopping positions of the two clutches.

Another object of the invention is to provide safety and theft-proof devices in the form of a shield spaced below knife blades to prevent fingers from being inserted up in the dispensing path around food elements and near the severing knives. Movements of the knives and shield are synchronized so that the knives act positively while the shield is still in a covering position. The shield is closed impositively by spring and is tipped with soft rubber to prevent injury to inserted fingers. If the shield is held open, electric contacts are opened to prevent operation of the dispensing clutches or handle.

Another object of the invention is to provide a carrying holder for the spiral rolls of food elements. This holder is to be used not only as a means for conveying and stacking the rolls in storage, but also as a means for providing free rotation of the spiral roll in the freezing compartment and to prevent sticking and freezing of the roll portions to the side walls of the compartment.

Another object of the invention is to use the regular freezing compartment of stock refrigerators for a dispensing station of refrigerated food elements. In the case of a narrow compartment such as found on the Norge refrigerator, a spiral roll of elements and its support is placed in the compartment. Attached to the mouth of the compartment are the guides with the detecting contacts for sensing the end element. Two such compartments can be provided for joint dispensing of vegetable and fruit bars. In the case of use of refrigerators with wide compartments, a separator wall plate can be inserted to divide a compartment into two adjacent sections and these can be used for two different kinds of bars, such as a meat bar and a vegetable bar.

Another object of the invention is to bring radiations such as ultra violet light into intimate contact with the packaged material as well as the interior of the package. To do this a quartz reflector and conductor tube is brought from the light source around the material spout and directly into the package to irradiate the inner walls.

It is also an object of the invention to make full use of the characteristics of hard film gelatine as a thermoplastic. When the film is already on a food bar as by dipping or spraying, then such a bar may be attached directly to feed bands of plastic by heat as an alternative to adhesive attachment of paper covers to the feed bands. In the case of sheets or strips for the continuous process, they may be made of cellulose or sheet gelatine and thus be edible as well as thermoplastic for joining, and shrinkable for air tight coverage.

Another object of the invention is to provide a more effective feeding device for refrigerated packages. It is not enough to provide positive feeding means for frozen articles because of the resistance to sliding and pushing movements usually found in vending devices. Therefore, it is thought of importance that the present spiral roll provides a peeling action which is so effective in separating frozen articles or packages.

It is an object to provide a vending means applicable to a wide variety of uses to articles and substances other than refrigerated ones. The refrigerated substances can range from plain water in the shape of ice cubes, sherbets, ice creams, gelatinous foods, butter, nuts, meats, jams, pickles, etc., of a more solid nature. Of the unrefrigerated articles, notions, toothpaste, shaving cream, candy bars, medicinal and sanitary goods are representative of the wide variety of small items readily carried in the packaging means disclosed.

Another object is to furnish a rapid continuous process whereby packaging of articles or food is carried on without stoppage, or slowing for cutting, cooling, attaching or spiral reeling. The idea is to use one or two thermoplastic strips which are joined to form successive pockets, there being interspersed filling operations between the pocket forming and sealing operations. Along with each sealing operation is a marginal punching operation to provide pin feed holes in the carrier film. In the case of filling with gelatinous mixtures, cooling follows sealing in two stages, a preliminary cooling before spiral coiling and a final cooling to set after coiling, although the latter alone is at times sufficient.

When filling with liquid, sherbert or purees, the continuous process may include an overfilling and pinching off action to insure full containers with no air space. Overfilling also involves use of a detector to determine when the degree of overfilling allows the skipping of a filling operation because more than one container filling is present due to successive overflows. When the filling includes solids, the portions are to be measured slightly under the container or pocket capacity and then the air space diminished by vacuum action and/or shrinkage of the plastic or film walls. In order to aid in shaping to the eventual spiral it is advantageous to shrink the rear wall of the container to preset it in an arc.

Other objects will appear and be expressed as this specification continues with reference to the drawings which include:

Fig. 1 is a diagrammatic showing of one process involving the laying of layers of gelatine and food bits followed by drying, cutting, (the last not needed with separate molds) separating, dipping and blowing followed by dropping, wrapping and refrigeration.

Fig. 1–A shows an alternative process with continuous feeding, filling, and coiling of joined thermoplastic strips formed into successive pockets.

Fig. 2 is a sectional view of a bar with 3 layers and one outer coat.

Fig. 2–A is a detail view showing how a single strip can be formed in the process of Fig. 1–A.

Fig. 3 is a detail view showing the top of a food bar with the remaining portion of the feed tape to be used as a tab to pull off the wrapper end.

Fig. 4 shows an alternative form of wrapper wherein either portion of feed tape may be grasped and pulled to tear off a whole side wall of the wrapper.

Fig. 4–A is a detail view of a beverage container mounted on the feed tapes.

Fig. 5 is a perspective view of the carrier for the spiral rolls. It is also a support for use in dispensing.

Fig. 6 is a side sectional elevation view showing a spiral roll of food elements in place in the freezing compartment of a refrigerator and having the loose ends of tape led down past pin feed wheels, knives and a shield to a dispensing cup.

Figure 7:
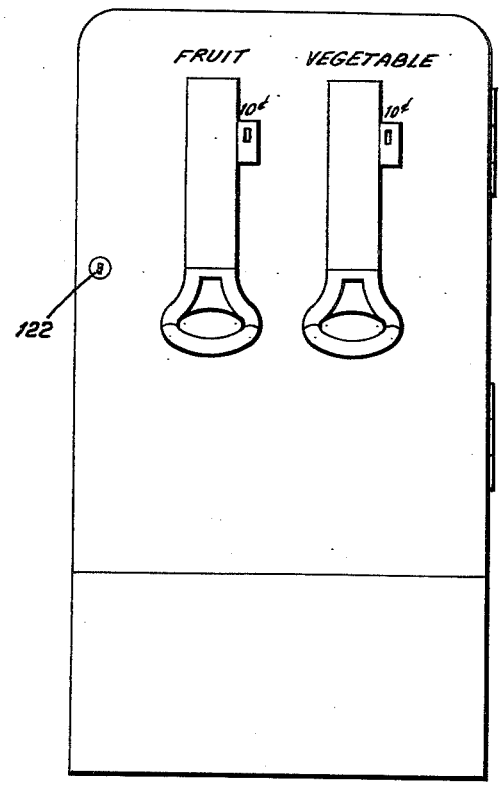

Fig. 7 is a front elevation view showing the exterior of two dispensing units in one refrigerator.

Figure 8:
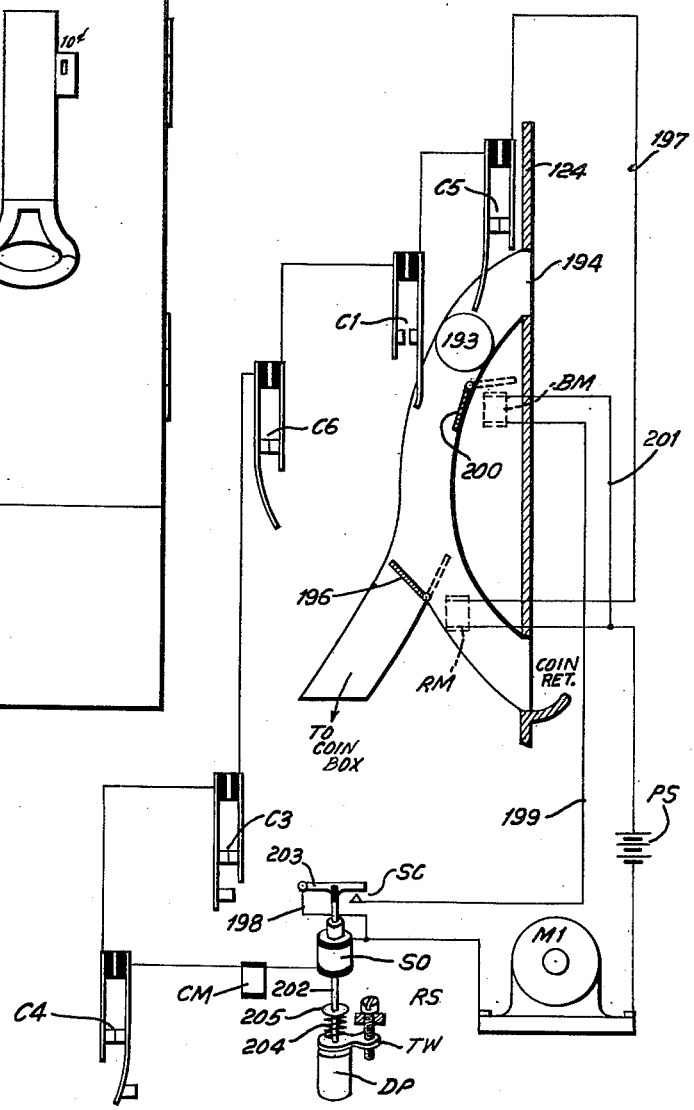

Fig. 8 is a wiring diagram showing the various protective devices and momentary operating means for a clutch magnet and solenoid and sustained operating means for the drive motor.

Fig. 9 is a perspective view of the food elements on feed tapes, and the pin wheel feed therefor. It also shows the tape cutting knives and the shield as a bail with a swinging crossbar to open the vending port.

Fig. 10 is another perspective view of the feeding, cutting and shielding controls with the drive motor, reduction gearing and clutches therefor.

Fig. 11 is a side elevation view of the ¼ revolution clutch for operating the cam to swing the knives and the shield.

Fig. 12 is a side elevation view of the other ¼ revolution clutch for operating the pin feed wheels after the other clutch is near the end of its drive.

Fig. 13 shows an alternative form of drive from the compressor motor by belt and gears in the door hinge.

Fig. 14 shows a third form of drive by means of rubber belt to the dispensing shaft in the door and from the compressor motor or another motor put on the floor to lighten the door.

Fig. 15 is a diagrammatic showing of how a manual control such as a simple swinging lever may be used to operate the knives, shield and pin feed, in the order mentioned, instead of using a motor drive.

Fig. 16 is a perspective view of an automobile roadside self-service vending bar with four vending devices.

The idea involves the dispensing of oblong portions of vegetable and fruit aspics from refrigerated containers. A 10¢ portion is believed a good size with a bar about 1 x 1 x 5″. In combination with one or two frankfurters, a balanced meal is realized with 1 or 2 of the new bars.

In order to pack them economically and dispense them easily, the thought is to encase each bar in a sanitary fashion in a coated paper cover, preferably by a standard wrapping machine. Then put the bars adhesively on marginal perforated tapes which enable them to be coiled in a spiral and fed by pin wheels accurately to a severing position. The knife merely cuts the marginal tapes to drop 1 bar out of the refrigerator.

In the refrigerator, most of the space is used for storage of the 2 kinds of spiral coils (vegetable and fruit). Two standard units or freezing compartments are spaced across the top of the refrigerator as the dispensing points. At the mouth of the unit is a retainer and depending guide for holding the coil in and at the same time guiding the leading edge or outgoing web to the feeding means and knife.

On the refrigerator door is most of the mechanism. It bears two coin release devices (vegetable and fruit), two operating handles, two sets of feeding wheels, two knives, two shields, two dispensing outlet cups and two coin bins. The door is locked and released by a clerk for replenishing the coils from the refrigerated stock. Inside the door and a part of the bottom of the door is a locked bin to which the coin collector has access with both the door key and bin key.

Upon deposit of 10¢, the handle is released and on a down stroke, the knife cuts off one bar and opens a shield. On the back stroke the knife retracted after automatic closure of the shield and only then are the feed wheels rotated to advance the tapes one unit. This shield idea not only prevents theft but also prevents children from having their fingers harmed by action of the device. The shield could have soft rubber edges to put pressure without injury on intercepted parts.

The end of a coil should be signalled by a flashing light and projection of a corn stop to prevent insertion of a coin.

If desired the dispensing unit could be motorized by a belt drive through a side wall to a pulley in the door, i. e., if the same compressor motor is to be used to drive clutches closed by coin operated contacts. Otherwise, a separate small motor may be mounted directly in the door and have a short shaft leading to two clutches, one for each dispenser.

3 styles:
(1) Manual
(2) Common motor (refrigerator motor)
(3) Separate motor

As examples of the food bars a fruit bar may consist of layers or single pourings of lemon and orange gelatine in which is submerged equal parts of apricots, figs, raisins and chopped toasted almonds. To this it is optional to add candied peel and shredded coconut and small measures of honey or corn syrup.

A vegetable bar may have a body of lemon or tomato aspic in which is put, separately or together, equal parts of shredded or minced carrots, cabbage and spinach with small amounts of vinegar, salt and finely cut onion.

As an example of a meat bar, cooked meats of a single variety or of combinations may be chopped or ground and embedded in gelatinous material flavored with tomato or meat juices such as beef broth and further flavored with salt, pepper, vinegar, parsley, celery and onion. There is also a coating of harder and more concentrated gelatine with monosodium glutamate.

It is to be understood that in this specification wherever the term gelatinous matter is used it is used in a sense broader than with reference to mere animal protein matter. Reference is intended to relate to all solid and semi-solid edible matter of vegetable, fruit or animal origin. As examples of such matter there may be mentioned the animal protein rennet as well as gelatine. In the vegetable, plant and fruit category we have agar agar, pectin, jelly, gliadin, cornstarch and a soybean protein identified as Gelsoy.

Fig. 4–A shows that the dispensed article could be a beverage holder or flask. In other words, the rectangular package held on the feed bands could be a liquid holder as well as a food bar element. The particular kind of beverage holder shown is illustrated as a plastic or wax paper box 31, one end of which is formed with a lip 32 and adjacent to it is a weakened V-shaped section 33 on one end of the box 31. The construction is so arranged to make the box leakproof and yet easy to open by the common form of beer can piercing tool 34 shown in Fig. 4–A, or by a pen knife. Such containers can be made of paper coated with tasteless and odorless Vinylite resins.

SUMMARY

The invention deals with food preparation and vending especially in dealing with food particles embedded in gelatinous material and coated with harder gelatinous film to hold the shape of the food as in bars more easily assembled, packaged, stored and vended.

Processes and methods of composing, shaping and wrapping the food elements are of concern in cooling and hardening the gelatinous bars either before or while film cover is placed thereon.

Feed bands are provided to make the articles or bars more easily fed and more surely vended. A positive feed by pin wheels in engagement with holes in the feed bands is provided. The articles, holders, pockets or bars on the feed bands are wound in a spiral coil or roll which is handy for storage and has the further advantage of providing a peeling separating action while being uncoiled which is useful in vending out of frozen storage.

A standard refrigerator can be used as the vending cabinet when article refrigerator is in order. And as a further move to standardization, a standard freezing unit compartment therein may be used as the holder and vending source of a spiral roll of article or food bar holders which require freezing temperatures as in the case of ice cubes. By mounting the coin receiver and vending devices on a panel attached to a wall or door of a standard refrigerator it is made easy to provide service, replacement and repair. When mounted on a standard door, the vending devices are changed by merely changing doors.

The vending devices are simple in having only one coin controlled clutch magnet and two clutches controlled seriatim thereby for cutting, shielding and feeding operations. The feed band cutter and shield are operated together so that the shield is opened only after the cutter has operated.

The coin controls provide interlocks to insure delivery of one article for each coin, and time delay devices allow full vending operation time.

A self-service roadside stand with elevated dispensers make them accessible from front and rear automobile windows.

The article

Referring to Figs. 3, 4, 6, 9, 12 and 15 it is seen that the vended element or food bar E is of an oblong shape with its sides attached to feed bands or tapes 20 and 21.

Each element instead of containing a beverage or food may contain notions, pills, sanitary goods, tooth paste, shaving cream, or any of the small items found in stores, in which case refrigeration is not needed, but the same sort of dispensing action on tapes is desirable.

Although two tapes 20 and 21 are shown it is apparent that they may be of one connected strip of paper, thermoplastic, polyethylene plastic, or cellophane.

Figure 2A:
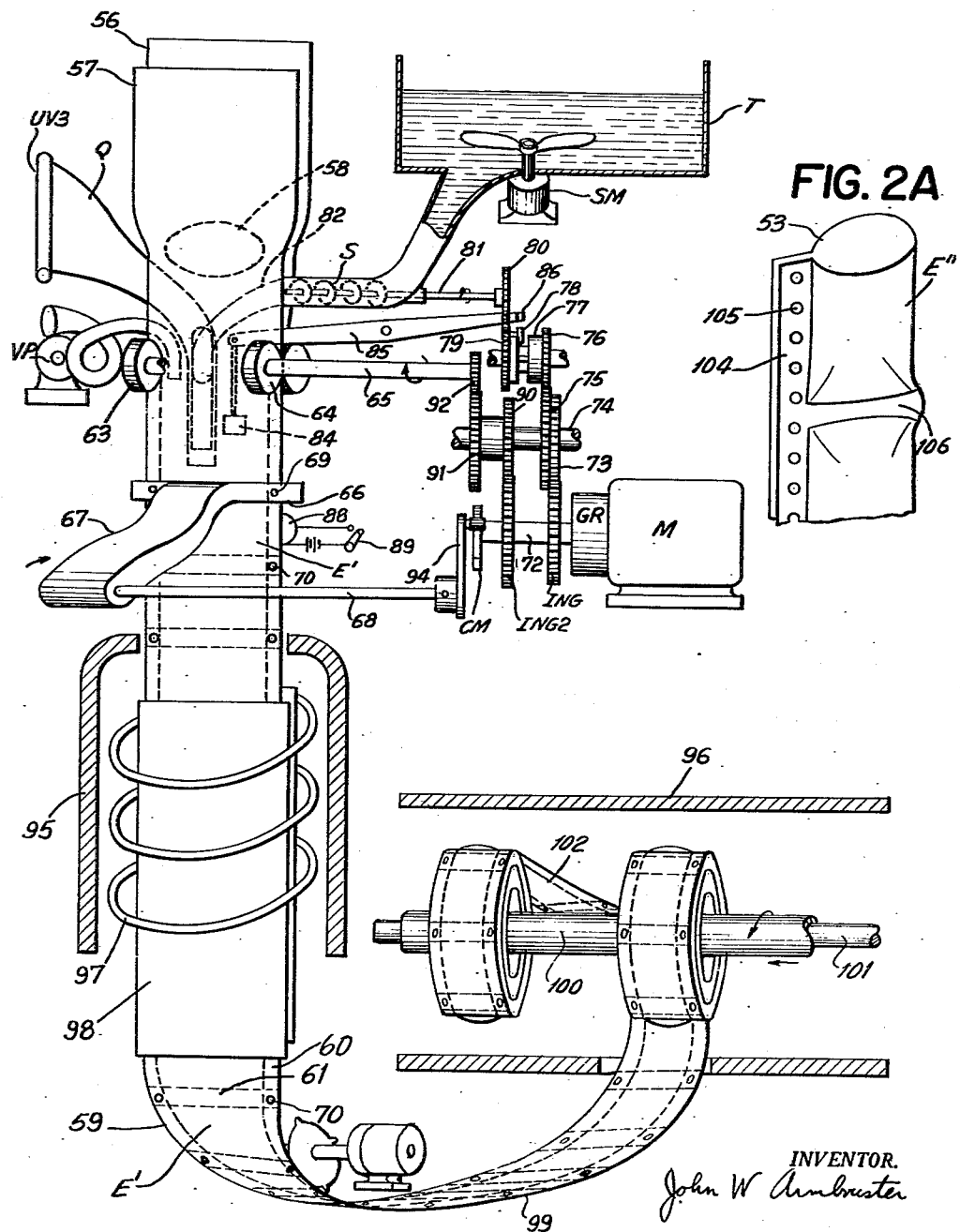

Turning to Fig. 2 the element E is shown in cross section as part of a gelatinous food bar with three layers 36, 37 and 38 of a gelatinous body material with different particles of fruit, vegetable or meat embedded in each layer. Although it is more economical to merge all such different particles in one mass, it is more appealing to have color contrasts such as the white of cabbage next to the orange of carrots and the green of spinach. An outer coating, film or wrapper 39 may be merely one or more dippings or sprayings of concentrated gelatinous material, or it may include other layers of waxed paper and advertising wrappers such as the covers 40 and 41 shown on Figs. 3 and 4.

In Figure 3 the wrapper 40 is formed with a line of weakness 42 running around the end of the element and in alignment with the inner edge of the feed tape 20 to which it is attached. A vertical and crossing line of weakness 43 helps the tear get started when the feed band portion 20 is grasped as a tab and pulled around to remove the end of the element cover.

When it is desired to remove a whole side wall of a cover such as cover 41 of Fig. 4, then the line of weakness 44 is made either coextensive with one wall of the wrapper or just within the edges of a wall as shown. The attachment to the feed bands is either solely within the weakened area or both within and around the outer end. In either event, by grasping either feed band portion and tearing away from the element E, the weakened wall is taken off and the element exposed.

A saving in space is effected if the elements E are attached on both sides of the feed bands and spaced therein irregularly to fit within the spaces caused by spiral coiling.

*A process*

In Fig. 1 is shown a process for pouring, cooling, irradiating, cutting, separating and dipping the food bars. Although shown as an automatic method it is apparent that all the steps may be carried out by hand.

A tray or pan 46 is placed on a traveling belt or chain 47 with respect to an operating projection 48 which travels to the right and trips in succession the dispensing levers of food hopper FH–1, gelatinous liquid holder G–1, food hopper FH–2, gelatinous liquid holder G–2, food hopper FH–3, gelatinous liquid holder G–3.

The breaks C–I in the chain indicate cooling and hardening intervals at which points refrigerated coils or plates (not shown) overly or surround the pan and harden successsive layers. An ultra violet or other germ killing radiation device UV–1 shines down on the exposed food spreading operations.

After the gelatinous food layers pass the final hardening stage C–I the pan appears under a cutting head CT which chops the mass into bars extending crosswise of the conveyor. At times it is advisable to cut the bars in the other direction, i. e., lengthwise, when shredded food particles are put in the gelatinous material and it is desired to gain the advantage of the strength of the particles to stiffen the bar. As the shreds tend to line up in the direction of movement of the liquid they act as stiffening rods in the eventual gel when it is cut lengthwise.

After cutting, the pan is carried to a slanted end of the conveyor where a stop 50 tips the hinged front end 49 of the pan 46 and the bars E tend to slide down but the first bar is held just outside the pan by the bottom flap of the hinge 49. If the tendency to slide down is not strong enough a heating element (not shown) can be applied under the pan just after the cutting operation.

The bars E are grasped successively by pairs of spring fingers 51 which have been traveling with the pan but now move relative thereto and pinch along the sides of the pan until the front end thereof releases them to pinch the extended bar.

As the bars E are separated they are exposed to a spray or mist of coating material sent out of the automatic gun 52. When cutting the food either in the process or beforehand, it is advisable to spray it with a mist of dilute gelatinous liquid especially when it is not to be immediately submerged or processed in food bars. This serves to retain full aroma and flavor by sealing in fresh volatile oils and juices. This spray mist may include common table salt or monosodium glutamate or a combination of both and a hint of suitable spices such as cinnamon with fruits, and parsley or chives with vegetables or meat.

An attendant at the conveyor end removes the empty pans 46.

The process continues automatically as the fingers 51 carry the bars down in the first dip vat 1–D which hold liquified concentrated gelatinous material. Before the second dip in vat 2–D with similar liquid, the bars are exposed to a sterile air blast out of blower BL, said air passing around radiation device UV–2.

After the second dip the pairs of fingers 51 are successively spread apart by a fixed wedge 54 and therefore drop the bars E on another conveyor 55 which carries them into wrapping, attaching and spiral coiling devices for immediate refrigeration. Ordinary candy bar wrapping machines may be used to add one or more covers such as cover 40, Fig. 3, and they may be applied under dehumidified and refrigerated conditions. It is also advantageous to handle, store and dispense all gelatinous articles with the humidity lowered.

*Alternate process*

As shown in Fig. 1–A the process of filling containers, forming feed bands, and spiral coiling is carried on more rapidly than with the process of Fig. 1. The advantages lie in use of thermoplastic strips, sheets or films, the simultaneous punching of feed bands thereon along with filling and sealing, and cooling and coiling as final steps which make the spiral rolls or reels of article holding pockets directly ready for refrigeration and/or vending.

In Fig. 1–A the two strips 56 and 57 are to be of a thermoplastic film and may be of an edible or inedible gelatinous material according to the contents and the purpose to be served by the film as a container, cover or pocket.

Although concentrated gelatine has been referred to hereinbefore mainly as a coating for food bars, there is another characteristic of it which is useful for packaging and feeding beyond the use as a protective coating. The characteristic referred to is the ability of it to act as a thermoplasitc, i. e., to be joined by heat to similar gelatinous strips, sheets or covers or to other plastics as a composite feed band. For example in the view, Fig. 1–A, one or both sheets 56 and 57 may be gelatinous strip material. And in the view Fig. 9, the bars E may be uncovered and free of any adhesive because the outer gelatinous coating can be connected to the feed bands 20 and 21 by heat alone.

The advantage of using gelatinous material as packaging material lies in its edibility. If any of it should stick to the food contents, there is no harm done during consumption, for it is as fully edible as the contents.

The continuous package filling device shown in Fig. 1–A is intended to portion out any of a variety of materials ranging from plain water, sherbets, ice cream, etc., to gelatinous mixtures with fruit, vegetables or meat, nuts, butter and semi-solid or solid materials. For the plain liquids it is advisable to use a pair of valves rather than the screw feed 5 shown as the portion measuring means.

A tank T is the holder of the filler material and when necessary this material is kept agitated by the blades of a stir motor SM which is mounted on the underside of the tank and sealed in leak proof gaskets. Stirring from below is believed preferable in order to keep the dust and oil from the motor from being cast down into the tank T which is ordinarily covered.

As the films 56 and 57 are fed downwardly they pass along the sides of a heated shaper 58 which causes the film centers to bulge in readiness for pocket shaping.

Separate pockets are formed in the film by continuously sealing together the margins 59 and 60 of both strips 56 and 57 and also of intermittently sealing a cross strip 61 between pockets. Successive operations cause the enclosure of pockets, containers or bars $E^1$ which are to all purposes the same as bars E.

The margin sealing is done by a pair of connected heated sealing and feeding rollers 63 and 64 on a shaft 65. Cross sealing is done by a heated bar 66 on an arm 67 extending from a shaft 68. Bar 66 also carries a pair of side punches 69 cooperating with a die (not shown) on the opposite side of the films. Although only one punch position is shown it is understood that a plurality of punches can be in line vertically. Every time the heated bar 66 is pressed against the films to seal off a pocket thermoplastically, it also punches marginal holes 70 for pin feed use. The pin feed wheels cooperating therewith later in the vending devices need not have a full complement of pin teeth but instead have the pins spaced as dictated by the film holes.

The driving means for the processing devices Fig. 1–A includes a motor M and a speed reduction gear unit GR. Extending therefrom is a shaft 72 carrying a pair of intermittent drive gears ING and ING–2 and a cam CM.

The first gear ING is in engagement with a driven intermittent gear 73 loosely mounted on an idler shaft 74. Attached to gear 73 is a gear wheel 75 in mesh with a pinion 76 which is on the driving part of a clutch 77 with a notched shoulder. In engagement with the notch is a clutch pawl 78 on the driven part of the clutch having a pinion 79 in mesh with a gear 80 on the screw feed shaft 81.

Ordinarily at the proper time in each cycle, i. e., after rollers 63 and 64 have sealed in side walls and bar 66 has sealed a pocket base, the intermittent gearing from gear ING, drives the clutch 77 and rotates screw shaft 81 the required number of times to pour or push out through spout 82 a measure of material into the open pocket. However, there are times when the screw feed or pouring operation is to be skipped as about to be explained.

When the filler matter is a liquid or semi-liquid such as a puree or sherbet without solid particles, it is advantageous for sealing purposes to overfill each pocket and pinch off the excess, i. e., raise it in the side sealed but open top portion of the joined films. In this way air is expelled, especially with the aid of the vacuum pump VP which has an air intake reaching into the open pocket but always above all possible filler levels. As the amount of overfill accumulates, a point is reached where the excess is equal to more than one measure or pocket full. This is detected by a cork float 84 on the lower end of a stem on the end of a lever 85 the other end 86 of which has an extension overlying clutch pawl 78 in its home position.

An amount of collected overfill greater than one measure, causes lifting of the float 84, clockwise rocking of lever 85, and depression of end 86 on a tail of pawl 78 to lift it out of clutch connecting position and thus cause the clutch to miss and skip one feed operation of screw S.

When the filler material involves solid particles it is better to underfill the pocket and rely on a combination of vacuum action, radiation and shrinkage to make it sterile.

Extending from an ultra violet lamp UV–3 is a quartz reflector and conductor Q shaped as a tube or spout which projects into the open pocket and there surrounds the transparent spout 82, a portion of which may also be made of quartz for ray penetration. A slot in the side of tube Q provides for entry of spout 82 therein so that both extend downward as radiant sleeves to sterilize the interior walls, the remaining air, and the incoming material.

For causing shrinkage along with or approximately at the time of sealing, there is provided a heating element 88 with a selective switch 89. This shrinkage on one side of the coil not only serves to eject air from the pocket but it also serves to preform the continuous tape so that one side is partly arcuate and ready for spiral coiling.

When heater action is critical according to the nature of the film and contents, rather than by switch, the heating action may be further controlled by separate commutator devices on shaft 72 for each of the heated parts 58, 63, 64, 69 and 88.

The driving means for the heated rollers 63 and 64 includes the intermittent drive gear ING–2 in cooperation with a driven intermittent gear 90 loosely mounted on the idler shaft 74. Attached to gear 90 is a gear wheel 91 which meshes with a pinion 92 on the shaft 65 bearing the rollers 63 and 64. After a filling operation, gear ING–2 becomes effective to rotate the rollers and feed the films 56 and 57 down one pocket length in readiness for the cross sealing action of lever 67.

Lever 67 is rocked for sealing and punching at the proper time by means of shaft 68 on the end of which is fixed an arm 94 with a roller riding on the periphery of the cam CM. A notch in the cam permits the arm 67 to rock clockwise to pinch together both films and effect a thermal seal.

After the film is filled and sealed it passes down thru a precooling station 95 which does not completely harden gelatinous material, and then it is brought over to a final cooling station where hardening does take place in combination with spiral coiling.

At station 95 are refrigerator coils 97 and metallic plates 98 between which the filled film is drawn down in contact therewith to remove some heat and initiate a partial set of ice, gelatinous matter, sherbets, ice creams, etc.

The rearwardly extending web 99 is clipped onto a tube 100 which is slidable and rotatable on a fixed shaft 101. The tube is rotated long enough to accumulate a spiral of desired size and then shifted to bring web 102 into the center at another clipping spot on the tube where the second spiral coil is started, etc. The adjustment of tube 100 may be carried on by hand or turned and shifted by intermittent controls from shaft 72.

In lieu of the use of two thermoplastic sheets 56 and 57, a single film 53 may be formed with pockets and a feed band as shown in Fig. 2–A. There it is seen that the single sheet is bent around to be sealed by one roller such as roller 63 along margin 104 and be sealed off into separate pockets or elements $E^{11}$ by cross sealing at 106 by a bar such as bar 66. Although the feed perforations 105 in the sealed margin could be cut by multiple punches such as punch 69 on bar 66, they could also be cut by the sealing roller which would have extending punch teeth acting as the rolling thermal seal action takes place.

*Films and coatings*

As a dipped, sprayed or sheet covering, the substances already pointed out for the body of a food bar, namely, gelatin, pectin, Gelsoy, etc., are also useful in concentrated form for the coating of the bars. Therefore, whenever a cover, coating or film is mentioned it is understood that it may be made of those materials as well as of a paper plastic, thermoplastic, cellulose or sheet gelatine.

The degree of rigidity of the film is to be gauged by the use in conjunction with the food contents. If it is to be eaten it is to remain flexible and be drawn from the organic materials mentioned. If it is to be merely a holder which is to be cracked or split open to reveal contents, then it may be made from any of materials mentioned, even such as papers, plastics, latex, etc., and be rigid. As with gelatin the rigidity is approximately proportional to the square of the concentration and decreases with increase in temperature. Rigidity reaches a constant value more rapidly from lower temperatures (by precooling) and decreases fast with decreasing average molecular weight.

As an edible film, regenerated cellulose is one acceptable form.

Another edible coating which may be applied by dipping or spraying is pectinate film. Pectinic acids are long-chain polymers of galacturonic acid partially esterified with methyl alcohol. If the ester content is reduced to about 7% or less, gel structures are formed from aqueous solutions of pectinic acids merely by the addition of polyvalent cations such as calcium ion. On drying, the gel becomes a transparent glossy film. Pectinate films can be prepared by extrusion of the pectinate into acidified calcium chloride solutions as well as by evaporation.

Such films may be carriers of fungicides, anti-oxidants, as spoilage preventatives, and also carriers of vitamins, flavors and condiments for appetizing values.

The spiral reel holder

In Fig. 5 is shown a carrier for a spiral roll of wound elements E on feed tapes. The carrier is a multiple purpose device because it is also used as a pivot in the refrigerator unit and there sprung open to hold the coil in place.

On a base plate 108 is erected two hinged or flexible sides 109 and 110, said sides carrying inwardly projecting centers or pivots 111 and 112 upon which the open center of the spiral coil is mounted for free rotation for vending.

The sides are formed with top sections 113 and 114 with matching lugs 115 and notches 116 for locking purposes. The sides are swung apart to receive a reel and then they are brought together so that lugs 115 snap into notches 116.

For carrying purposes, finger openings 117 are formed in the sides. A slot 118 in the base plate is provided to receive a top hook portion 119, Fig. 6, of a hanging guide or channel 120 which is formed with side walls to conduct the cold air of a refrigerator unit down along the path of feed bands to the vending port.

The refrigerator

In Fig. 6 a spiral roll R1 is shown pivoted on the center 112 of the carrier within the freezing unit FU of a standard refrigerator. In order to hold it in place, the sides of the carrier are allowed to spring outward and press against the inside of the unit. In other words, the carrier is put in freely when connected and then top portion 113 is pressed down to disconnect lugs 115 and allow side frames 109 and 110 to press outwardly and maintain position in the unit FU.

A standard refrigerator box B and unit FU may be used and if the unit is too wide it may be blocked out to the size of one reel carrier or separated into two sections to take two adjacent reels as shown in Fig. 7.

Storage of extra reels R2 and R3 is done in the extra shelf space in the refrigerator. Coils may be changed by a clerk having access by opening lock 122, Fig. 7.

The present mode of dispensing from a coil has the advantage of a peeling action which is found most effective in separating frozen articles. Positive feeding of a refrigerated article is not enough, because considerable resistance is offered to any device endeavoring to separate frozen articles by sliding or pushing actions, it is only through a peeling or gradual prying action such as here disclosed that a satisfactory separation is effected.

Although emphasis is on the use of the freezing compartment of a refrigerator, it will be noted that the temperature setting and use thereof is to be gauged by the contents of the package to be dispensed. For example, in the case of aspics and gelatine bars it is at times advisable for matters of taste and appearance to avoid freezing and crystallization and for such uses the use of the compartment for storage is either dispensed with or regulated to keep it above freezing temperatures. However, when used to store and vend plain ice cubes, ice creams or sherbets mixtures, the sub freezing conditions of the compartment are to be used.

If necessary a chemical drying agent may be placed in the refrigerator to reduce the humidity.

The refrigerator door DR, Fig. 6, is to be of standard size and shape and merely have new opening in which panels and frames of the vending mechanism are to be inserted.

Attached to the inside of the door near the top is a pair of normally closed contacts C2 the inner blade of which presses against the feed band 20 or elements E thereon to detect the passage of the end of the roll or lack of elements for vending.

A curved guide 123 held across and within the unit FU serves to direct the leading end of the feed band down into the door opening DO.

A removable outer panel 124 covers all of the vending mechanism and gives access thereto for service. An inner plate or frame 125 holds most of the mechanism and is removable so that a change of the vending unit can be effected by merely removing frame 125 and its attachments, or the entire door may be replaced.

The three main elements supported on the plate 125 are the pin feed wheels 126, the knives 128 and the shield 130, all shown more clearly in Fig. 9.

Turning back to Fig. 6 it is seen that below the shield 130 is the curved vending port VP which leads to the exposed cup 132 on the outside of the door.

Inside the lower part of the door is a coin box CB with an inner hinged door and lock L which is accessible only to a collector having both a clerk's key for lock 122, Fig. 7, and a key for lock L.

The vending mechanism

As shown in Fig. 9, the elements E are advanced one by one by cooperation of the pin feed wheels 126 and 127 with the marginal perforations in the feed bands 20 and 21. The shield 130 closes the upper part of the vending port and prevents theft of the lowermost element E and at the same time prevents insertion of fingers near the knives 128 and 129 which close to sever the feed bands between the first and second elements and thus free the lowest element E to drop thru the shield opening and out of the vending port and into the cup.

As the parts are shown in Fig. 9, the first thing to happen is the rotation of shaft 134 to which is attached the two four lobed cams 135 and 136, Fig. 10, for operating the shield and knives. The cams cooperate with rollers 137, Fig. 9, extending from the sides of arms 138 and 139 which are integral with shield 130 and form a bale with pivotal mountings 140 on ears 141 extending from plate 125. A cam lobe hits roller 137 and rocks the bale counterclockwise about center 140 and rocks the shield 130 toward the open position. A spring (not shown) holds the bale against the cams.

As the bale arms 138 and 139 are rocked rearwardly, they contact with and push on the edges of the horizontally mounted knives 128 and 129 and sever the feed bands 20 and 21. In the case of cutting a full width feed band as film cross seal 61, Fig. 1-A, a single full length knife would be used.

However, for the narrow feed bands shown in Fig. 9, it is enough to swing short blades 128 and 129 across cooperating cutting edges 143 and 144 formed on the bottom of plate 125. This lower end of plate 125 is also formed with horizontally extending tabs 145 and 146 on which are pivoted the knife blades 128 and 129. Springs 147 not only tend to keep the knives open and restore them, but they also bear against bale 138, 139 and hold it against the operating cams.

The pin wheels 126 and 127 are connected by a tube 148 loosely mounted on shaft 134 and driven by clutch devices described hereinafter.

Slots are cut in frame 125 in line with the feed perforations 70 and behind the wheels 126 and 127 so that the extending teeth or feed pins thereon may project thru the bands and carry them down positively as the wheels are turned.

Drive mechanism and clutches

In Figs. 10, 11 and 12 are shown most of the driving parts for operating the feed wheels, knives and shield.

A small electric motor M1, Fig. 10, may be mounted in the refrigerator door. Extending therefrom is an operating worm 150 in mesh with a worm wheel 151 on a short shaft 152. This shaft 152 may extend to the right as well as to the left and have a similar set of operating gears, clutches, etc., to operate a second vending device when two such devices are mounted in one box as shown in Fig. 7.

Three webs or walls 154, 155 and 156 are within the door and either extend inwardly from panel 124, Fig. 6, or outwardly from frame 125 to support the three shafts 134, 152 and 157, Fig. 10, as well as the clutch armature levers pivoted around the two lower shafts.

Also attached to drive shaft 152 along with worm wheel 151 is a drive gear 159 and a notched clutch drive disk 160. The latter is on the end of shaft 152 and opposite it is the end of shaft 134 bearing a clutch plate 161 with a pawl 162 pivoted thereon and held normally out of engagement with disk 160 by the armature 163 of the clutch magnet CM, Fig. 11. It will be remembered that shaft 134 is the driver for cams 135 and 136 which operate the shield and knives.

Because of the short movements required, a four place clutch is used as seen in Fig. 11. There it is noted that the armature 163 is formed with an arm 164 extending from the pivot 165 on frame 154 and that three similarly shaped pawl stop levers 166 are connected by stiff wires 167. A spring 168 and stop stud 169 holds the armature 163 and stop levers 166 in a normal pawl stopping position to stop pawl 162 in any of the four positions.

When magnet CM is operated momentarily, all four stops are released, the pawl 162 engages, and shaft 134 is carried around one quarter revolution.

Near the end of the movement of shaft 134, a cam 171 attached thereon is effective to trip the clutch for the pin feed wheels 126 and 127.

In order to drive the clutch for the pin feed it is necessary to bridge over the clutch for the shield and knives. This is done by the idler shaft 157 on bearings in frames 154 and 155 and carrying pinions 172 and 173, the former in mesh with drive gear 159, and the latter in mesh with a gear 174 loosely pivoted on shaft 134.

Attached to the side of gear 174 is a notched clutch disk 175 adapted to cooperate with a clutch pawl 177 pivoted on the side of pin feed wheel 126. The extending end of pawl 177 is offset to miss the feed band 21 and it abuts against one of four cam stop levers 178. These stop levers are similarly shaped with cam faces 179 in the path of cam 171. All four pivots 180 are on frame 155 and arms 181 of the levers are connected by stiff wires 182. A spring 183 and stop stud 184 tend to hold all clutch parts in normally disengaged positions.

And as an end result of the energization of clutch magnet CM, and through the turning of shaft 134 and cam 171, finally the cam strikes one of the levers 178 and releases the pawl 177 in whatever position and it then engages disk 175 and partakes of its movement for one quarter revolution before being stopped again by the next lever 178. Since pawl 177 is on pin wheel 126 which is connected to the other pin wheel 127 by tube 148, both wheels are turned clockwise, Fig. 12, one quarter revolution which is proportioned to advance the feed bands 20 and 21 exactly the distance between elements E thereon in readiness for a cutting operation between elements.

Alternate driving means

Other driving means to take the place of motor M1, Fig. 10, are shown in Figs. 13 and 14. These motors M2 and M3 are to be either the compressor motors or separate motors mounted in the bases of cabinets B1 and B2 for convenience sake.

Fig. 13 shows a drive including a belt 186 around a pulley on motor M2, and at the top the belt goes around a pulley fixed to a gear 187 which may be a plain, bevel or crown gear. Gear 187 is fulcrumed with the wall near the hinge bevel and the gear partially extends through a wall opening at the hinge and designed to mesh with a pinion 188 mounted on shaft 152' within the door and projecting through an opening in the door so that when it is closed the gear and pinion are put in mesh. Detents can be provided to hold the parts in meshing position. A speed reduction gearing unit should be between the motor M2 and the lower pulley.

Fig. 14 shows a simple drive whereby an extensible rubber or plastic belt is drawn around a pulley on motor M3 and through rounded openings in a plate 191 on the bevel hinge portion of the side wall. The top end of the belt passes around a pulley 190 in the door and fastened to drive shaft 152'. An opening in the door gives access to pulley 190 which is formed with high belt ridges to hold belt 189 thereon when the door is opened. When the door is shut the drive connections are maintained.

It is pointed out later that when a compressor motor is used for a vending driver some interlocks may be adjusted to cause a proper pickup of refrigeration for the loss of each port opening.

The coin controls

A wiring diagram is shown in Fig. 8 with electrical controls for the clutch magnet CM and motor M1 as initiated by contacts closed by a coin and other interlock contacts for various controls.

When a coin 193 is dropped in slot 194 in panel 124, it momentarily opens contacts C5 and then passes on to momentarily close contacts C1. A circuit is then established including normally closed contacts C6 which are opened only by a break in the feed bands or the end of the spiral reel, normally closed contacts C3, which are opened by an open shield, normally closed door switch contacts C4, clutch magnet CM, solenoid SO, motor M, power source PS, magnet RM (for operating shutter 196 to send the coin to the coin box) wire 197, normally closed interlock contacts C5 (opened by the insertion of elongated objects in an effort to close contacts C1 without a coin) and then back to contacts C1 closed by the coin.

Lack of a circuit allows shutter 196 to remain in the home position and cause return of the coin down the coin return chute.

Energization of clutch magnet CM is only long enough to allow the coin to drop in and the clutch to be tripped.

However, another hold circuit is prepared for motor M1 through the solenoid contacts SC to insure that the vending operating drive is continued until feed band advance is accomplished. The hold circuit includes wire 198, contacts SC, wire 199, magnet BM for operating shutter 200 to hold up a second coin while the drive due to a first coin is taking place, wire 201 and through the power source and motor M1 back to the hold contacts SC.

The solenoid plunger shaft 202 which at the top has an insulated hook in contact lever 203, extends down and into a dash pot DP for slowing up the restoration of the plunger and opening of contacts SC as urged by a spring 204 pressing between a regulatory timing washer TW and a flange 205 on shaft 202.

By turning the regulating screw RS threaded in washer TW it is possible to raise or lower this member relative to spring 204 and thus vary the pressure of spring 204 as desired and cause slower or faster action by the dash pot in opening contacts SC. This may be used not only for vending action timing, but also, in the case of the use of the compressor motors M2, Fig. 13, and M3, Fig. 14, in place of motor M1, for refrigeration timing to make up in refrigeration effect for loss of refrigeration due opening of the vending port.

15
Manual control

In Fig. 15 is a diagrammatic showing of vending operation caused by lever action. The shielding, cutting and feeding devices are assumed to be mounted and arranged much like the same parts in Fig. 9. The hand lever 210 is pivotally mounted on shaft 134' and connected thereto are a pair of downwardly extending arms 211 abutting against knives 128' and 129' (not shown).

When a coin 212 is dropped to close contacts 213, a circuit is established through dual wound coil 214 and a latch pawl 215 is lifted from a lock stud 216 on lever 210 freeing the lever for clockwise operation. A hold circuit is set up through contacts 216 which are closed and held closed until the lever is operated. The hold circuit includes contacts 216, lever 218, wire 219, battery BA, wire 220 and coil 214.

As soon as lever 210 is pulled down, a one way pawl 221 thereon, strikes against the lower end of lever 218 and breaks open contacts 216 to open the hold circuit. However, by that time, stud 216 is past the end of lock pawl 215 and is free to be pulled down.

A full stroke pawl 223 cooperates with teeth 224 on an arcuate portion of lever 210 and prevents partial operation and restoration of the lever.

In addition to operation of the knives, the lower ends 211 of lever 210 are provided on both sides with studs 225 for pushing against one way pawls 226 pivoted on the top of a sliding shield 130'. Retracting springs 227 tend to pull the shield back closed against stop studs 228. However, on the downstroke of the lever the shield 130' is pushed back and opened by the studs 225 moving against pawls 226. Then, after the knives have cut the feed bands 20 and 21 and dropped an element E down below the shield and into the vending port VP, the lever continues further in a clockwise direction and then the arc of the studs 225 passes above the top of pawls 226 and the shield 130' is freed to snap back closed toward the right as urged by springs 227.

The drive for the pin feed wheels is late and on the up stroke of lever 210. For this purpose a pawl 230 is pivoted at 231 on an extension of the lever. The pawl ratchets idly over a ratchet wheel 232 when the lever 210 is pulled down, however, on the upstroke the pawl is effective to drive the ratchet wheel 232 and connected pin wheels (not shown here) in a counterclockwise direction to advance the feed bands and elements E one unit as driven by the restoring spring 233.

Automobile service units

In order to make the vending devices more accessible, easier and quicker to operate from an automobile seat, it is desirable to mount them specially in sets and with automobile construction and proportions in mind.

It is contemplated that the auto service units such as shown in Fig. 16 are to be situated preferably at about 90 miles or three hours traveling time from centres of population and located behind gas stations with large parking areas.

These units comprise a housing H which may be one half of a small quonset hut. In the hut are four elevated vending devices or dispensers D separated by insulated walls W so that each may be either a hot or cold article dispenser for summer or winter use. A car bumper B protects the front lower section of the hut.

The coin receivers and dispensing openings of the four dispensers are offset so that the front two are close together and the back two also together to coincide with the front and back window openings of the car of average size.

Separate ventilation V and V' is provided for each of the four sections to economize on refrigeration, and also to allow separate closure for electric heating of heated dispensers.

An overhead door DR can be brought down and locked to prevent theft and vandalism, or a folding steel grill may be pulled in from the sides.

In a divisional application, Serial No. 648,319, filed on March 25, 1957, subject matter is claimed other than that claimed herein.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention. It is the intention, therefore, to be limited only as indicated by the scope of the following claim:

What is claimed is:

In a continuous process for forming containers of gelatinous food for refrigeration and dispensing, feeding intermittently two facing strips of film, forming facing bulges along the centers of the lengths of the strips, joining the margins of said strips to form a tube, irradiating the inner part of said tube with ultra violet light to sterilize a food receiving portion of the tube and the air therein, joining a section of the tube to form a container end, exhausting the air therein, inserting in said tube a measure of said gelatinous food in excess of a container portion, said joining operations in succession serving to elevate and pinch off the excess food and expel air from a closed container, sensing the food height level of inserted food in said tube, skipping a food inserting step when the height level shows an excess of more than a container portion, punching feed control perforations in both said margins and outside the food enclosing surfaces of the tube, cooling the filled tube container portions in an extended length, winding the filled tube in successive spirals, and further cooling said spirals.

References Cited in the file of this patent
UNITED STATES PATENTS

| | | |
|---|---|---|
| 428,502 | Maggi | May 20, 1890 |
| 895,527 | Williams | Aug. 11, 1908 |
| 943,652 | Coe et al. | Dec. 21, 1909 |
| 1,500,547 | Chambers | July 8, 1924 |
| 1,710,393 | Williams | Apr. 23, 1929 |
| 1,813,935 | Knee | July 14, 1931 |
| 1,845,879 | Knee | Feb. 16, 1932 |
| 2,028,256 | Stevens et al. | Jan. 21, 1936 |
| 2,113,658 | Lakso | Aug. 10, 1937 |
| 2,142,505 | Gammeter | Jan. 3, 1939 |
| 2,146,308 | Maxfield | Feb. 7, 1939 |
| 2,154,521 | Maxfield | Apr. 18, 1939 |
| 2,155,445 | Pittenger et al. | Apr. 25, 1939 |
| 2,191,352 | Oprean | Feb. 20, 1940 |
| 2,194,451 | Soubier | Mar. 19, 1940 |
| 2,200,971 | Sonneborn | May 14, 1940 |
| 2,259,866 | Stokes | Oct. 21, 1941 |
| 2,274,065 | Hull | Feb. 24, 1942 |
| 2,314,632 | Rear | Mar. 23, 1943 |
| 2,367,300 | McManus | Jan. 16, 1945 |
| 2,401,131 | Bensel | May 28, 1946 |
| 2,503,518 | Slaughter | Apr. 11, 1950 |